April 20, 1926.
N. O. SALVOG
LOCKING HOOK FOR ANTISKID CHAINS
Filed Nov. 7, 1925
1,581,875
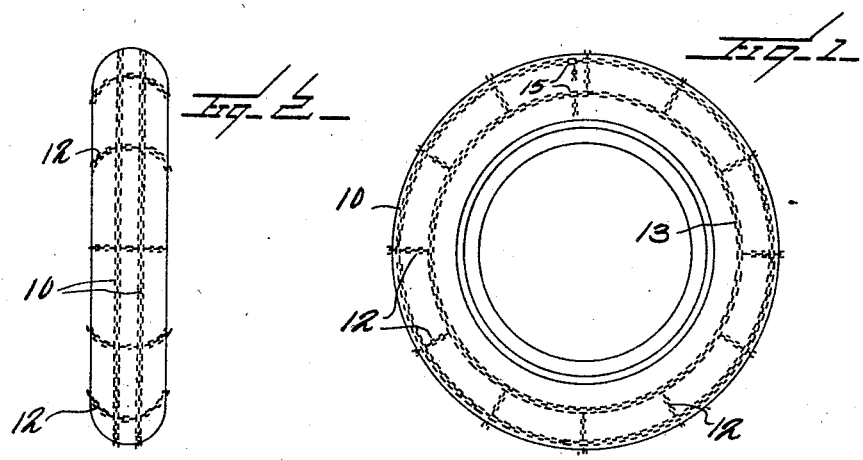
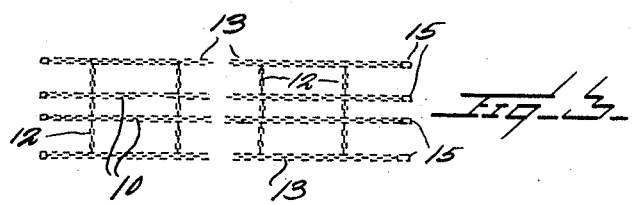
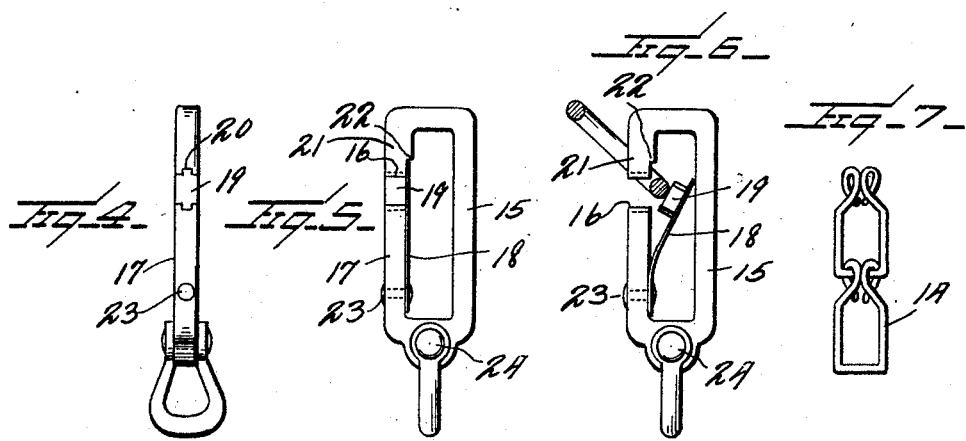
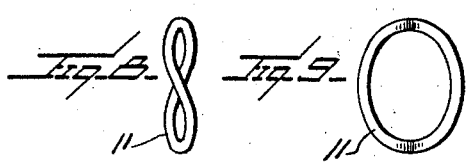
Inventor
N. O. Salvog
By Watson E. Coleman
Attorney Patented Apr. 20, 1926.

1,581,875

UNITED STATES PATENT OFFICE.

NELS O. SALVOG, OF KNOX, NORTH DAKOTA.

LOCKING HOOK FOR ANTISKID CHAINS.

Application filed November 7, 1925. Serial No. 67,634.

*To all whom it may concern:*

Be it known that I, NELS O. SALVOG, a citizen of the United States, residing at Knox, in the county of Benson and State of North Dakota, have invented certain new and useful Improvements in Locking Hooks for Antiskid Chains, of which the following is a specification, reference being had to the accompanying drawings.

This invention relates to anti-skid chains for vehicles, the general object of the chain being to prevent lateral skidding of an automobile or other vehicle wheel.

One of the more specific objects of the present invention is to provide a mechanism of this kind in which the circumferentially extending anti-skid chains and the side chains are connected by a novel form of hook which is so constructed that it would be impossible for it to become unhooked without some manual operation, this hook being strong, rigid and adapted to stand strain.

Other objects will appear in the course of the following description.

My invention is illustrated in the accompanying drawing, wherein:—

Figure 1 is a side elevation of a wheel having my anti-skid chain applied thereto;

Figure 2 is an edge elevation of the wheel;

Figure 3 is a top plan view of the anti-skid chain;

Figure 4 is an edge elevation of the hook;

Figure 5 is a side elevation of the hook for the chain;

Figure 6 is a side elevation with the hook open, a link being shown in section;

Figure 7 is an elevation of a portion of one of the side chains;

Figure 8 is a view of one of the main links;

Figure 9 is a face view thereof.

Referring to this drawing, it will be seen that my anti-skid chain consists of two or more longitudinally extending anti-skid chains proper, designated 10, each of these chains being formed of nearly flat links 11, the link being approximately circular in shape and twisted in its own plane. There are two of the skid chains 10 disposed in spaced relation to each other about one and a half inches apart and these are connected at intervals as, for instance, every six inches by cross chains 12 likewise composed of the links 11.

Longitudinally extending side chains 13 are provided, these being composed of the links 14, and the cross chains 12 are connected to the links of the chains 13. One extremity of each of the longitudinally extending chains 10 and 13 carries upon it a hook, designated generally 15, composed of an elliptical link, one longitudinal bar of which is cut out or opened at 16. Mounted upon the inner face of the bar 17 of the link is a flat leaf spring 18 carrying upon its face a locking member 19 of such size that it will fit within the opening 16. Preferably this locking member is formed upon its upper and lower faces with longitudinally extending ribs 20 and preferably the end of the portion 17 and the end of the opposed portion 21 are slotted to receive these tongues 20. The inner face of the portion 21 is recessed at 22 to receive the upper end of the spring 18 so that when the spring is released and the member 19 is in place between the members 28 and 17, the spring will not project out into the body of the link but will form a continuation of the inner surface of the link. This spring may be attached to the link in any suitable manner but is shown as being riveted thereto, as at 23. This link or hook is provided with a pin 24 whereby it may be connected to the corresponding chain 10 or 13 and, of course, the link on the other end of the corresponding longitudinally extending chain is to be engaged by this hook or locking link in the manner illustrated in dotted lines in Figure 3. This hook may be readily opened at any time to disengage the chain, but when the spring is released the member 19 will immediately be forced into the gap between the two ends of the link or hook and will close the same. The link with which the hook is engaged may be readily shifted around within the hook with no danger at all of escape therefrom and the greater the pull of the link upon the hook, the more tightly the locking member 19 will be held in place within the gap 16.

An anti-skid chain constructed in accordance with my invention is very effective for preventing lateral skidding of the wheel, particularly where it is extremely muddy or icy. The relatively flat and slightly twisted links of the cross chains and skid chains have a relatively great tractive bearing without rendering the chain liable to slide or slip. The connecting hook between the ends of the longitudinal chains is positive in its action and cannot come undone without manual interference.

I claim:—

A hook for use in connecting the longitudinal chains of anti-skidding devices, the hook having the form of a link formed with a gap in one side, a flat leaf spring attached to the inside face of the link and extending beyond the gap, a filling piece mounted upon the spring and yieldingly held in position in said gap when the spring is in normal position, the filling piece and the adjacent walls of the gap having tongue and groove engagement, the inside face of the link being cut away to receive the end of said spring.

In testimony whereof I hereunto affix my signature.

NELS O. SALVOG.